Figure 1:
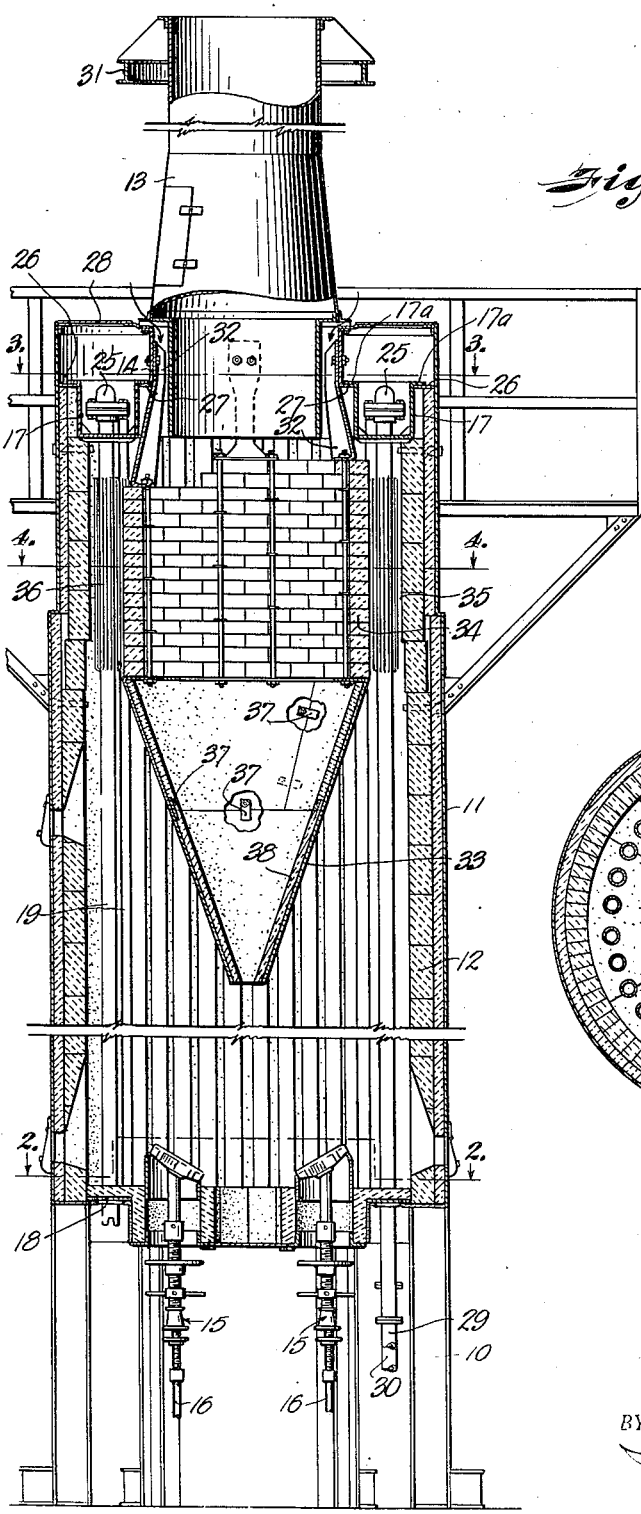

Feb. 1, 1944. J. W. THROCKMORTON ET AL 2,340,287
FURNACE CONSTRUCTION
Filed Feb. 2, 1942 2 Sheets-Sheet 1

INVENTORS.
John W. Throckmorton
John S. Wallis
BY Thos. E. Scofield
ATTORNEY.

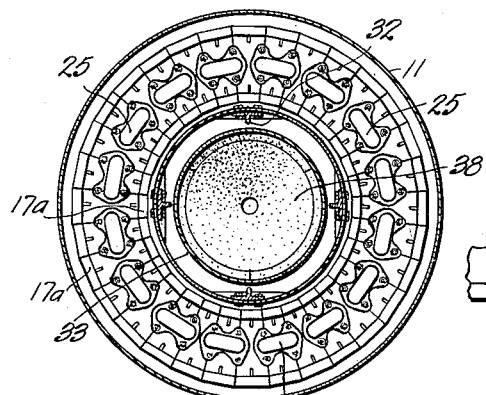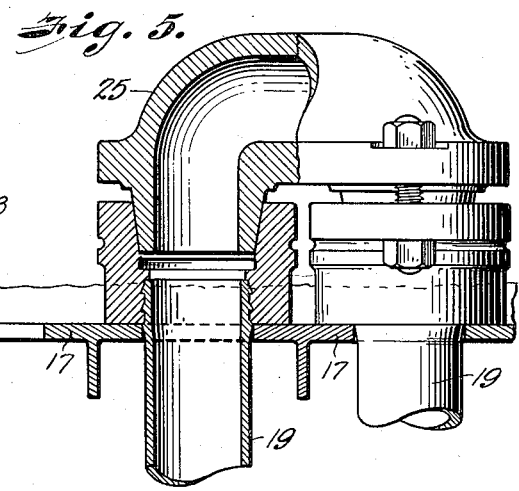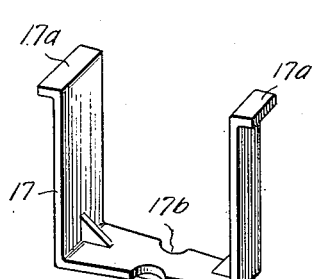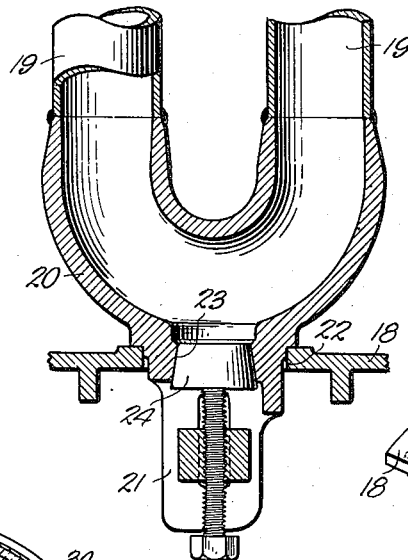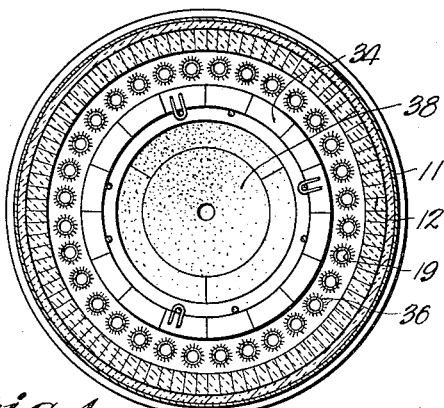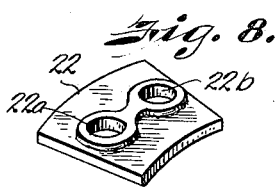

Patented Feb. 1, 1944

2,340,287

UNITED STATES PATENT OFFICE 2,340,287

FURNACE CONSTRUCTION

John W. Throckmorton, Wilton, and John S. Wallis, Darien, Conn., assignors to Petro-Chem Development Company, New York, N. Y., a corporation of Delaware Application February 2, 1942, Serial No. 429,175

7 Claims. (Cl. 122—356)

The invention relates broadly to improvements in furnace construction and more particularly to improvements in vertical tubular furnaces of the type used in distillation or cracking processes of crude petroleum, hydrocarbons, chemicals and like products.

Furnaces of the type particularly referred to are provided with a combustion chamber which encloses a bank of tubular heat exchange elements. These heat exchange tubes are usually arranged vertically in the combustion chamber and provide a continuous passage therethrough for fluid to be heated. Solids suspended in the fluid collect and harden on the internal tube surfaces. The internal surfaces are also subject to corrosion due to impurities such as sulfur compounds in the fluid to be heated. Incomplete combustion or impurities in the fuel burned causes soot or other deposits to form on the external surfaces of the tubes. Furthermore, the external surfaces are subjected to corrosion and oxidation from the flue gas. Fluid at high temperatures and under pressure is passed through the tubes. After the furnace has been operated for a substantial length of time, the tubes enlarge or "creep" and it is necessary to caliper the inside and outside of the heating surfaces. As a result, it is necessary that the tubes be periodically removed for cleaning and inspection.

The fluid enters the furnace in a relatively cool condition and, after traversing the bank of heat exchange tubes, is discharged from the furnace in a relatively heated condition. Heating gases are supplied to the combustion chamber by burners arranged to distribute the heat uniformly within the furnace. In the upper portion of the combustion chamber is positioned a cone for reflecting the radiant heat toward the portion of the tubes extending through the lower or radiant section of the combustion chamber and for deflecting the gases around the portion of the tubes extending through the cooler upper or convection section of the chamber.

An important object of the invention is to provide a furnace construction wherein the heating elements are divided into units which are separately removable to facilitate cleaning thereof.

Another object of the invention is the provision, in a furnace of the above mentioned character, of a reradiating cone formed of connected sections that may be disassembled to effect removal of the cone through the stack opening of the furnace.

Still another object of the invention is the provision of a reradiating cone having a superimposed baffle sleeve mounted concentric to the wall of the combustion chamber to provide an annular passageway of restricted dimensions through which the heat exchange tubes pass, the sleeve being uniquely shaped to increasingly resist the flow of heated combustion gases through the passageway from the fluid inlet of the heat exchange tubes to the fluid outlet thereof so that progressively greater quantities of the heated combustion gases will flow around the relatively cool tubes adjacent the fluid inlet.

Yet another object of the invention is the provision of directional burners in the combustion chamber for projecting the combustion gases into different parts of the chamber.

Other objects and advantages of the invention will be apparent during the course of the following description.

Figure 2:
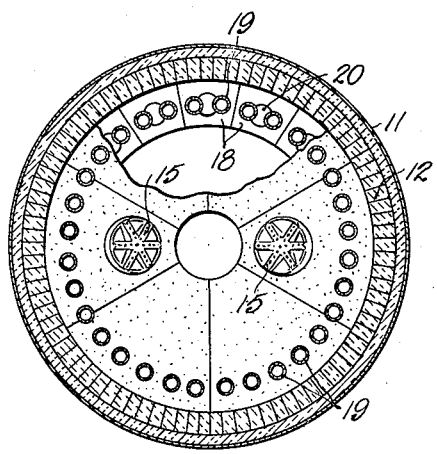

In the drawings forming a part of this specification and wherein like numerals are employed to designate like parts throughout the same, Fig. 1 is a vertical sectional view of a tubular furnace embodying the invention, Fig. 2 is a transverse sectional view taken on the line 2—2 of Fig. 1, Fig. 3 is a transverse sectional view taken on the line 3—3 of Fig. 1, Fig. 4 is a transverse sectional view taken on the line 4—4 of Fig. 1, Fig. 5 is a fragmentary elevational view of the heat exchange tubes forming a part of the furnace, parts of the tubes being shown in section for clearness of illustration.

Fig. 6 is a perspective view of a segmental plate employed to support the upper ends of the heat exchange tubes, Fig. 7 is a perspective view of a segmental plate employed to support the lower ends of the heat exchange tubes, and Fig. 8 is a perspective view of a plate similar to the plate shown in Fig. 7, said plate being uniquely constructed to accommodate the fluid inlet and outlet pipes that conduct the fluid to be heated to and from the heat exchange elements.

In the accompanying drawings wherein, for the purpose of illustration, is shown a preferred embodiment of the invention, the furnace is mounted upon a support 10 and comprises an outer cylindrical casing 11 of sheet metal lined with a refractory material 12. The space within the furnace comprises a combustion chamber. Extending through the refractory material forming the bottom of the furnace are directional burners 15. Combustion gases are supplied to the burners through the pipes 16. The burners are rotatable and may be adjusted to project the burning gases into various parts of the combustion chamber and to uniformly distribute the heating gases throughout the combustion space. The combustion gases discharge from the furnace through a stack or flue 13, supported at the top of the furnace by means of the structural members 14.

Vertical heat exchange tubes 19 within the furnace are supported at their upper and lower ends by segmental guide plates 17 and tube supporting plates 18. The tubes are disposed in a circle and adjacent to the wall of the combustion chamber. The tubes 19 are arranged in pairs and the tubes of each pair have their lower ends welded to a header or return bend 20. The headers 20 are formed with depending shank portions 21 which extend through openings 22 in the segmental plates 18, the plates being supported below the refractory material comprising the bottom of the furnace. Each of the lower headers is formed with a relatively large opening 23 which is closed by removable plug 24. The plug 24 is removed from the opening 23 to facilitate cleaning of the U-shaped unit thus formed. The heat exchange elements are thus arranged in U-shaped units about the inner wall of the furnace. Adjacent tubes 19 of the units are connected at their upper ends by removable headers 25. As best shown in Fig. 1, the upper ends of the heat exchange tubes 19 are supported by essentially U-shaped plates 17, the flanges 17a of which rest upon ledges 26 and 27. The ledge 26 projects inwardly from the casing 11 and the ledge 27 projects outwardly from the flue supporting structure 14. The space between the casing 11 and the flue 13 into which the upper ends of the heat exchange tubes project is closed by a removable cover 28.

Fluid to be heated is supplied to the heat exchange tubes through an inlet pipe 29 and discharged through an outlet pipe 30. As best shown in Fig. 8, one of the segmental plates 18 is uniquely formed with openings 22a and 22b to receive the inlet and outlet pipes 29 and 30. The heat exchange tubes form a continuous passage about the combustion chamber from the fluid inlet pipe 29 to the fluid outlet pipe 30.

As the fluids traverse the heat exchange tubes deposits accumulate therein. Heretofore it has been the general practice to clean the tubes without removing them from the furnace. However, due to external deposits and corrosion from the flue gas, or tube growth, or "creep," it is highly desirable that the tubes be cleaned, calipered and inspected both internally and externally. This may best be done if the tubes are removed. The construction of the furnace is such that the heat exchange tubes may be easily removed for cleaning or replacement purposes with a minimum expenditure of time and effort. After the cover 28 and upper headers 25 have been removed, a hoist (not shown) traveling on the track 31 may be operated to lift any one of the U-shaped heat exchange units vertically from the furnace. Thus, any one unit or all units of the heat exchange tubes may be easily removed. The upper supporting plates 17 are unattached and may be easily removed to facilitate lifting of the heat exchange units from the furnace. The plates 17 are arranged side by side with the recesses 17b snugly fitting the heat exchange tubes 19. When the plates are in position they effectively seal the top of the combustion chamber to prohibit undesirable air infiltration around the upper ends of the tubes.

Supported in the upper or convection section of the combustion chamber by hangers 32 is a reradiating cone 33. The cone is disposed within the circle of heat exchange tubes and is surmounted by a baffle sleeve 34 of refractory material which cooperates with the inner wall of the furnace to provide an annular passageway 35 of restricted dimensions through which the upper portions of the heat exchange tubes pass. The burning gases projected into the combustion chamber by burners 15 heat the lower portions of the heat exchange tubes 19 by radiant heat. The burning gases rising within the combustion chamber are reflected against the heat exchange tubes by the reradiating cone 33 which also deflects the gases into the annular passageway 35 and around the upper portions of the heat exchange tubes. For the purpose of convenience, the section of the combustion chamber below the reradiating cone is referred to as the radiant section because the portions of the heat exchange tubes passing therethrough are subjected principally to radiant heat and the section of the combustion chamber above the reradiating cone is referred to as the convection section because the portions of the heat exchange tubes extending above the reradiating cone receive principally convection heat. The portions of the heat exchange tubes 19 passing through the convection section of the furnace are formed with extended surfaces of fins 36 which offer increased heat absorption surface where the combustion gases are at reduced temperature. The portions of the heat exchange tubes extending through the radiant section of the furnace are plain surfaced.

The fluids to be heated enter the furnace in a relatively cool condition and discharge therefrom in a relatively heated condition. For example, fluid may enter the furnace at a temperature of approximately 300° F. and be discharged therefrom at a temperature of approximately 600° F. The combustion gases entering the flue 13 are approximately 150° F. above the temperature of the fluid in the tubes around which the gases are flowing. Thus, for the fluid temperatures given, the temperature of the exhaust combustion gases flowing around the fluid inlet tubes would be approximately 450° F., and the temperature of the exhaust combustion gases flowing around the fluid outlet tubes would be approximately 750° F. to give an average exit flue gas temperature of 600° F., if equal quantities of the gases pass around each heating element.

We propose to provide a construction that will cause a greater quantity of combustion gases to flow about the heat exchange tubes adjacent the fluid inlet, the quantity of combustion gases passing about the heat exchange tubes being progressively less toward the fluid outlet. This result is accomplished by increasing the height of the baffle sleeve 34 from the fluid inlet to the fluid outlet, as best shown in Fig. 1. By increasing the height of the baffle sleeve in this manner, the resistance to the passage of combustion gases through the annular passageway 35 is progressively increased from the fluid inlet 29 to the fluid outlet 30. It is elementary that the combustion gases will follow the path of least resistance. Consequently, a greater quantity of the gases will flow about the heat exchange tubes adjacent the fluid inlet than will flow about the heat exchange tubes adjacent the fluid outlet. For example, if 25 per cent of the combustion gases pass adjacent the relatively heated tubes connecting with and adjacent to the fluid outlet 30 and 75 per cent of the combustion gases flow about the relatively cool heat exchange tubes connecting with and adjacent to the fluid inlet 29, the average temperature of the exhaust gases will be approximately 525° F. for the fluid temperatures mentioned above. Considerably more heat will therefore be transferred from the combustion gases to the fluid within the heat exchange pipes and a furnace of higher thermal efficiency is obtained.

The reradiating cone 33 is formed in segments held together by brackets 37. The brackets are welded to one section and bolted to the adjacent section so that the cone may be disassembled and the respective sections removed separately through the stack opening of the furnace. After the segments of the reradiating cone have been assembled within the furnace a layer of air setting cement 38, or other suitable material, is applied to the inner surface of the cone.

By making the reradiating cone 33 and the heat exchange tubes 19 easily removable, the refractory material 12 enclosing the combustion chamber may be easily repaired or replaced. It is frequently necessary that the refractory be repaired and it is occasionally necessary that it be replaced. Portions of this refractory are substantially inaccessible in furnaces of the type now in general use. However, if the furnace is constructed in accordance with the teachings of this invention, the reradiating cone and heat exchange tubes may be easily removed to render all parts of the refractory readily accessible.

It may thus be seen that we have accomplished the objects of our invention. We have provided a furnace wherein each unit of the heat exchange tubes may be easily removed to facilitate cleaning and to permit access to be had to the refractory wall 12 of the furnace. The reradiating cone, conventional in furnaces of this nature, is uniquely constructed to be easily disassembled and removed through the stack opening of the furnace. Directional burners 15 extend through the bottom of the furnace. By rotating the burners, they may be made to project the combustion gases into different parts of the furnace to more efficiently heat the fluid in the heat exchange tubes and to distribute the heating gases uniformly throughout the combustion space. The superimposed baffle sleeve 34 of the reradiating cone has been uniquely constructed to progressively resist passage of the combustion gases through the passageway 35 from the fluid inlet 29 to the fluid outlet 30 of the heat exchange tubes 19. Greater quantities of the combustion gases are thus caused to flow around the relatively cool heat exchange tubes adjacent the fluid inlet to greatly increase the thermal efficiency of the furnace.

It is to be understood that the form of our invention herewith shown and described is to be taken as a preferred example of the same and that various changes in the size, shape, and arrangement of parts may be resorted to without departing from the spirit of our invention or the scope of the appended claims.

Having thus described our invention, we claim:

1. In a furnace construction, a wall of refractory material providing a combustion chamber, a bank of tubular heat exchange units within the combustion chamber, upper and lower return bends connecting adjacent heat exchange units, the upper return bends located outside the combustion chamber the lower return bends located inside the combustion chamber, removable cover sections in the top of the combustion chamber surrounding the upper ends of the tubular heat exchange units, the arrangement being such that any one or all of the heat exchange units may be lifted from the combustion chamber when upper return bends are removed.

2. In a furnace construction, a wall of refractory material providing a combustion chamber, a bank of U-shaped tubular heat exchange units within the combustion chamber, upper return bends connecting adjacent heat exchange units, the upper return bends located outside the combustion chamber and the lower ends of the U-shaped units located inside the combustion chamber, supports releasably holding the upper and lower end portions of the heat exchange units, and removable cover sections over said upper return bends.

3. In a furnace construction, a wall of refractory material providing a combustion chamber having radiant and convection sections, a bank of heat exchange tubes in the combustion chamber providing a continuous passage from a fluid inlet to a fluid outlet, and a deflector member in the convection section of the combustion chamber, said member having a lower conical portion for reflecting the combustion gases toward the heat exchange elements and an upper wall portion of progressively increasing height from the fluid inlet to the fluid outlet.

4. In a furnace construction, a wall of refractory material providing a combustion chamber having radiant and convection sections, a source of combustion gases in the radiant section of the chamber, a bank of heat exchange tubes in close proximity to the wall having extended surfaces for increasing heat absorption and providing a continuous passage from a fluid inlet to a fluid outlet, and a deflector member in the convection section of the chamber, said member including a vertical wall section arranged concentrically to the wall of refractory material to provide a relatively narrow passageway through which the heat exchange tubes pass, the said deflector wall being of progressively increasing height from the fluid inlet toward the fluid outlet of the heat exchange tubes whereby to cause progressively increasing flow of combustion gases through the said passageway from the fluid outlet toward the fluid inlet.

5. In a furnace construction, an enclosing wall of refractory material providing a combustion chamber having radiant and convection sections, an essentially circular bank of heat exchange tubes in the combustion chamber and in close proximity to the said wall, said heat exchange tubes having a fluid inlet and a fluid outlet, and a deflector member in the convection section of the combustion chamber and within the space surrounded by the heat exchange tubes, said deflector member having a lower tapered portion adapted to reflect the combustion gases toward the heat exchange tubes and an upper sleeve portion spaced from the wall to provide an annular passageway of restricted dimensions through which the heat exchange tubes pass, said upper sleeve portion being adapted to resist the flow of the gases through the passageway progressively from the fluid inlet of the heat exchange tubes to the fluid outlet thereof.

6. In a furnace construction, a casing providing a combustion chamber, a lining of refractory material for said chamber, a bank of substantially vertical, individually removable U-shaped tubular heat exchange units within said chamber, removable plates supporting the lower ends of the heat exchange units, removable guide plates holding the upper ends of the heat exchange units in fixed relation with each other, burners for injecting heated combustion gases into the chamber and against the heat exchange units, a baffle in the combustion chamber for directing the gases around the upper end portions of the heat exchange units, and an exhaust flue gas duct above said baffle.

7. In a furnace construction, a wall of refractory material providing a combustion chamber, a bank of tubular heat exchange units within the combustion chamber, upper removable return bends and lower fixed return bends connecting adjacent heat exchange units, the upper return bends located outside the combustion chamber the lower return bends located inside the combustion chamber, removable cover sections in the top of the combustion chamber surrounding the upper ends of the tubular heat exchange units, the arrangement being such that pairs of heat exchange units may be lifted from the combustion chamber by removal of upper return bends.

JOHN W. THROCKMORTON.
JOHN S. WALLIS.